(12) United States Patent
Yip

(10) Patent No.: US 6,922,491 B2
(45) Date of Patent: Jul. 26, 2005

(54) WAVELET FILTERING

(75) Inventor: Dominic Yip, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 09/805,877

(22) Filed: Mar. 15, 2001

(65) Prior Publication Data

US 2001/0033698 A1 Oct. 25, 2001

(30) Foreign Application Priority Data

Mar. 16, 2000 (AU) .............................................. PQ6302

(51) Int. Cl.[7] .............................................. G06K 9/40
(52) U.S. Cl. ...................... 382/260; 382/240; 382/275; 382/282; 358/3.26; 358/3.27; 358/538
(58) Field of Search ................. 382/219, 240, 382/252, 260, 274, 275, 282, 305; 358/3.26, 3.27, 512, 453, 538, 463

(56) References Cited

U.S. PATENT DOCUMENTS

| | | | | |
|---|---|---|---|---|
| 5,657,416 A | * | 8/1997 | Boon .......................... | 386/109 |
| 5,802,369 A | * | 9/1998 | Ganesh et al. ............... | 709/247 |
| 5,859,788 A | * | 1/1999 | Hou ............................ | 708/400 |
| 6,069,712 A | * | 5/2000 | Dellert et al. ................ | 358/408 |
| 6,266,450 B1 | * | 7/2001 | Yip et al. .................... | 382/240 |
| 6,389,417 B1 | * | 5/2002 | Shin et al. ................... | 707/6 |
| 6,668,090 B1 | * | 12/2003 | Joshi et al. .................. | 382/239 |

OTHER PUBLICATIONS

E. Stollnitz, Wavelets For Computer Graphics, Theory and Applications, p. 5.
A. Bruce, Wavelet Analysis, IEEE Spectrum, vol. 33, No. 10 (1996), pp. 26–35.

* cited by examiner

*Primary Examiner*—Bhavesh M. Mehta
*Assistant Examiner*—Yosef Kassa
(74) *Attorney, Agent, or Firm*—Fitzpatrick, Cella, Harper & Scinto

(57) ABSTRACT

The preferred method wavelet filters a digital image. The digital image comprises a plurality of pixels arranged in a plurality of columns and rows. The method processes one or more bands of pixels of the image in turn, where each band comprises a plurality of rows. The method performs the following steps for each column in each one of the one or more bands of pixels. The method retrieves (316) a last pixel and last high pass coefficient previously stored in local storage. The method also inputs (306) a current group of adjacent pixels. The method then computes (308) the low and high pass wavelet coefficients utilizing the current group of adjacent pixels and the previous last pixel and last high pass coefficient. The method then outputs the low and high pass coefficients, and stores (312, 318) a current last pixel and high pass coefficient in either the local storage or external memory.

26 Claims, 4 Drawing Sheets

Cycle 0

Cycle 1

WAVELET FILTERING

TECHNICAL FIELD OF THE INVENTION

The present invention relates generally to wavelet filters and, in particular, to wavelet filtering of digital images.

BACKGROUND

The field of digital data compression and in particular digital image compression has attracted great interest for some time.

In the field of digital image compression, many different techniques have been utilised. In particular, one popular technique is the JPEG standard, which utilises the discrete cosine transform to transform standard size blocks of an image into corresponding cosine components. In this respect the higher frequency cosine components are heavily quantized so as to assist in obtaining substantial compression. The heavy quantization is an example of a lossy technique of image compression. The JPEG standard also provides for the subsequent lossless compression of the transform coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Typically, data compression using wavelet techniques is a two step process. It comprises, firstly, a transform phase, during which the wavelet transform of the data set is calculated, and secondly a subsequent coding stage during which the resultant data set from the transform operation is separated into segments which are then coded using a specific coder. In decompression, the reverse occurs, with coded blocks being first decoded, and subsequently the inverse wavelet transform being applied to generate the final decompressed output.

Typically, the wavelet transform operation utilises a number of wavelet filters. These filters are typically digital filters, such as finite impulse response (FIR filters) which ideally are linear and require a small number of taps. These filters process the digital images in bands and typically require a large external store for storing overlapping pixels, coefficients, and/or intermediate results for processing the next band. The bandwidth to the external store is typically limited, which restricts the rate of reading and writing of overlapping pixels, coefficients, and/or intermediate results to the store.

DISCLOSURE OF THE INVENTION

It is an object of the present invention to substantially overcome, or at least ameliorate, one or more disadvantages of existing wavelet filters.

According to a first aspect of the invention, there is provided a method of wavelet filtering a digital image, the digital image comprising a plurality of pixels arranged in one or more bands of pixels, the method performing the following steps for each one of said one or more bands of said pixels: retrieving a plurality of previous partial results from a first or second storage; inputting a current group of adjacent said pixels; computing coefficients utilising said current group of adjacent pixels and said plurality of previous partial results; outputting said coefficients; and storing a plurality of current partial results in said first storage if said current group is not the last group in the band, in said second storage if said group is the last group in the band.

According to a second aspect of the invention, there is provided an apparatus for wavelet filtering a digital image, the digital image comprising a plurality of pixels arranged in one or more bands of pixels, the apparatus comprising: means for retrieving, for each one of said one or more bands of pixels, a plurality of previous partial results from a first or second storage; means for inputting, for each one of said one or more bands of pixels, a current group of adjacent said pixels; means for computing coefficients, for each one of said one or more bands of pixels, utilising said current group of adjacent pixels and said plurality of previous partial results; means for outputting, for each one of said one or more bands of pixels, said coefficients; and means for storing a plurality of current partial results in said first storage if said current group is not the last group in the band, in said second storage if said group is the last group in the band.

According to a third aspect of the invention, there is provided a computer readable medium comprising a computer program for wavelet filtering a digital image, the digital image comprising a plurality of pixels arranged in one or more bands of pixels, the computer program comprising: code for retrieving, for each one of said one or more bands of pixels, a plurality of previous partial results from a first or second storage; code for inputting, for each one of said one or more bands of pixels, a current group of adjacent said pixels; code for computing coefficients, for each one of said one or more bands of pixels, utilising said current group of adjacent pixels and said plurality of previous partial results; code for outputting, for each one of said one or more bands of pixels, said coefficients; and code for storing a plurality of current partial results in said first storage if said current group is not the last group in the band, in said second storage if said group is the last group in the band.

According to a fourth aspect of the invention, there is provided a wavelet filter for wavelet filtering a digital image, the digital image comprising a plurality of pixels arranged in one or more bands of pixels, the filter comprising: a first storage for storing a plurality of previous partial results; a second storage for storing a plurality of previous partial results, a controller for selecting the plurality of previous partial results from said first or second storage; a pixel input mechanism for inputting a current group of adjacent said pixels; a lifting lattice of multiplier and adder units for computing coefficients utilising said current group of adjacent pixels and said selected plurality of previous partial results; output means for outputting said coefficients; and a controller for storing a plurality of current partial results in said first storage if said current group is not the last group in the band, in said second storage if said group is the last group in the band.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
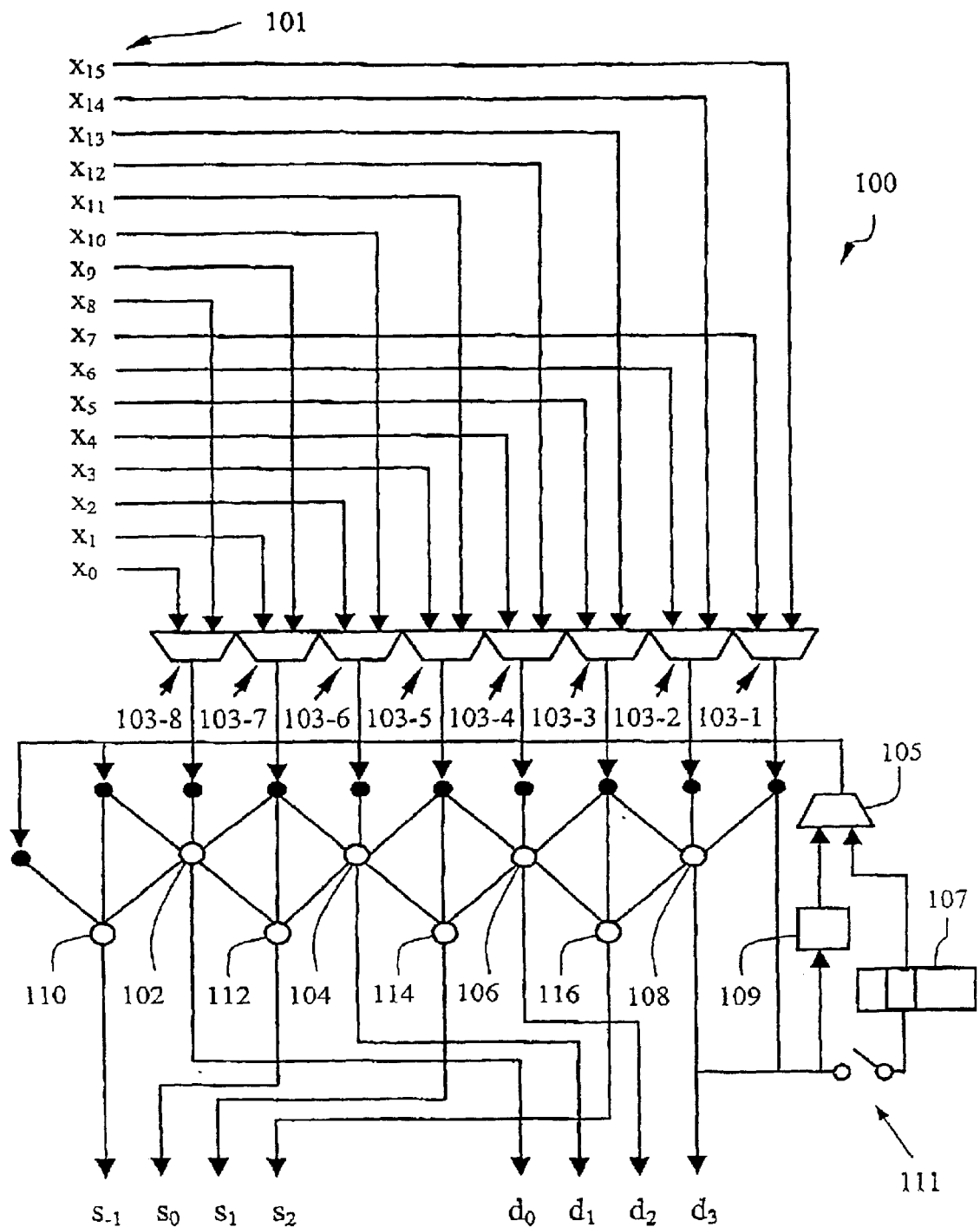
FIG. 1 is a schematic representation of a K-line 5-3 wavelet filter (with K=8) for filtering a digital image in accordance with a first embodiment.

Where reference is made in any one or more of the accompanying drawings to steps and/or features, which have the same reference numerals, those steps and/or features have for the purposes of this description the same function (s) or operation(s), unless the contrary intention appears.

The principles of the preferred embodiments described herein have general applicability to the implementation of K-line wavelet filters. However, for ease of explanation, the embodiments have been described with reference to a K-line 5-3 wavelet filter for use in a forward discrete wavelet transform of digital images. However, it will be readily evident that the invention is not limited thereto. For instance, the wavelet filter can also be used in K-line 9-7 wavelet filters. Furthermore, it would be apparent to a person skilled in the art that the wavelet filter can be modified for use in an inverse discrete wavelet transform. Still further, it would be apparent to a person skilled in the art that two such wavelet filters can be combined in known manner to provide a 2-dimensional discrete wavelet transform or modified for use in a 2-dimensional inverse discrete wavelet transform. Moreover, the wavelet filter can be used in many different applications. For examples of the many different applications of wavelet analysis to signals, reference is made to a survey article entitled "Wavelet Analysis" by Bruce et. al. appearing in IEEE Spectrum, October 1996, pages 25 to 26. For a discussion of the different applications of wavelets in computer graphics, reference is made to "Wavelets for Computer Graphics", page 5, I. Stollinitz et. al. published 1996 by Morgan Kaufmann Publishers, Inc.

As mentioned above, the embodiments of the invention can be used in a discrete wavelet filter transform as well as an inverse discrete wavelet transform. For the sake of simplicity, the term wavelet transform used herein or variations thereof is taken to include both a forward and/or an inverse wavelet transform, unless the contrary intention appears. Similarly, the term pixel as used herein or variations thereof is taken to refer to the original pixels or wavelet coefficients of a digital image, unless the contrary intention appears. Similarly, the term digital image or variations thereof is taken to include an original image or a sub-band of that original image, or one or more associated sub-bands of wavelet transformed coefficients of that original image.

Turning now to FIG. 1, there is shown a schematic representation of a K-line 5-3 wavelet filter (with K=8) for filtering a digital image in one dimension in accordance with a first embodiment. The digital image comprises a plurality of pixels arranged in a plurality of columns in the vertical direction and a plurality of rows in the horizontal direction.

The filter 100 processes one horizontal band of the digital image after another. The digital image comprises one or more such horizontal bands, with the horizontal bands comprising a plurality of said rows of said pixels. The filter 100 initially commences processing the uppermost band of the image, and then processes the next adjacent band of the image, and so on until the lowermost band of the image is processed. Within each band, the filter 100 processes one column of pixels after another. The filter 100 first processes the left column of the band, and then the next adjacent column of the band, and so on until the right column of the band is reached. For ease of understanding, the pixels in each column of a band from the topmost pixel to the lowermost pixel are represented as $x_0, x_1, x_2, \ldots x_k'-1$.

Within each column of a band, the filter 100 processes a first group of adjacent pixels (commencing with the topmost group) and then processes a second group of adjacent pixels adjacent the first group.

In this way, the filter 100 performs a one dimensional discrete wavelet transform in the vertical direction. In another embodiment, the filter 100 can also be adapted to perform a one dimensional discrete wavelet transform in the horizontal direction by processing vertical bands one after another in similar fashion. In still another embodiment, the filter can also be adapted to provide a 2-dimensional wavelet transform. In the latter case, one filter 100 processes one column at a time first, and a second filter 100 after that collects the output of the first filter 100 and processes one row at a time.

The pixels (e.g. $x_0, x_1, x_2, x_3, x_4, x_5, x_6, x_7, x_8, x_9, x_{10}, x_{11}, x_{12}, x_{13}, x_{14}$ and $x_{15}$) of a column of a band are fed to the filter 100. These pixels are fed in parallel to the wavelet filter 100 via a number 2K (with K=8) of input lines 101. The 16 input lines 101 are connected to eight 2-input multiplexers 103-1, 103-2, 103-3, 103-4, 103-5, 103-6, 103-7, and 103-8. The multiplexers can select either the bottom eight lines or top eight lines for input of the groups of pixels ($x_0, x_1, x_2, x_3, x_4, x_5, x_6$, and $x_7$) or ($x_8, x_9, x_{10}, x_{11}, x_{12}, x_{13}, x_{14}$ and $x_{15}$) respectively. The multiplexers 103-1, 103-2, 103-3, 103-4, 103-5, 103-6, 103-7, and 103-8 are connected to a lifting lattice of multiplier and adder units 102, 104, 106, 108, 110, 112, 114, and 116, which compute the high pass coefficients and low pass coefficients on the top 8 lines (ie. coefficients ($x_8, x_9, x_{10}, x_{11}, x_{12}, x_{13}, x_{14}$ and $x_{15}$)) or the bottom 8 lines (ie. coefficients ($x_0, x_1, x_2, x_3, x_4, x_5, x_6$, and $x_7$)). The lifting lattice of multiplier and adder units 102, 104, 106, 108, 110, 112, 114, and 116, perform the following calculations:

$$d_n = x_{2n} + \alpha(x_{2n-1} + x_{2n+1}) \; n=0, 1, \ldots, K-1 \qquad (1)$$

and, $$s_n = x_{2n+1} + \beta(d_n + d_{n+1}) \; n=-1, 0, \ldots, K-2 \qquad (2)$$

where $d_n$ are all the high pass coefficients, $s_n$, all the low pass coefficients, $\alpha = -0.5$, and $\beta = 0.25$.

For example, the multiplier and adder units 102, 104 106, 108, 110, 112, 114, and 116 perform the following calculations on the selected input pixels ($x_0, x_1, x_2, x_3, x_4, x_5, x_6$, and $x_7$) to compute the high pass coefficients $d_n$ and the low pass coefficients $s_n$:

$$\text{unit 102} \; d_0 = x_0 + \alpha(x_{-1} + x_1)0 \qquad (3)$$

$$\text{unit 104} \; d_1 = x_2 + \alpha(x_1 + x_3) \qquad (4)$$

$$\text{unit 106} \; d_2 = x_4 + \alpha(x_3 + x_5) \qquad (5)$$

$$\text{unit 108} \; d_3 = x_6 + \alpha(x_5 + x_7) \qquad (6)$$

$$\text{unit 110} \; s_{-1} = x_{-1} + \beta(d_{-1} + d_0) \qquad (7)$$

$$\text{unit 112} \; s_0 = x_1 + \beta(d_0 + d_1) \qquad (8)$$

$$\text{unit 114} \; s_1 = x_3 + \beta(d_1 + d_2) \qquad (9)$$

$$\text{unit 116} \; s_2 = x_5 + \beta(d_2 + d_3) \qquad (10)$$

The high pass and low pass coefficients $d_n$ and $s_n$ are then passed to other discrete wavelet transform circuits or entropy coder (not shown in the figure).

The multiplier and adder units 110 and 102 also accept inputs from either the partial result registers 109 or external buffer 107, depending on the control on the multiplexer 105. Namely, the multiplier and adder units 110 and 102 accept input from the external buffer 107 when computing the first 8 lines and accept input from the partial result registers 109 for the last 8 lines.

A controller 111 controls the storing of a last input pixel and a last high pass coefficient (e.g. $x_7$ and $d_3$) to the partial result register 109 or external buffer 107 depending on which lines are being processed. Namely, the last input pixel and the last high pass coefficient of the first 8 lines are stored in the partial result register 109. However, when the lifting lattice of multiplier and adder units is computing coefficients for the last 8 lines, the last input pixel and last high pass coefficient are stored in the external buffer 107. The last input pixel and last high pass coefficient are required for computation of the low and high pass coefficients of the next adjacent group of pixels within the column.

For example, in the case where the filter 100 is currently processing the pixels ($x_8$, $x_9$, $x_{10}$, $x_{11}$, $x_{12}$, $x_{13}$, $x_{14}$, and $x_{15}$), the multiplier and adder units 110 and 102 accept as input the last pixel and coefficient $x_7$ and $d_3$ from the partial result registers 109, which were previously stored in the partial result register 109 during the previous computation of the pixels ($x_0$, $x_1$, $x_2$, $x_3$, $x_4$, $x_5$, $x_6$, and $x_7$) of the same column and band. In the case where the filter 100 is currently processing the pixels ($x_0$ to $x_7$), the multiplier and adder units 110 and 102 accept as input the last pixel and coefficient $x_{15}$ and $d_7$ from the external buffer 107. These inputs $x_{15}$ and $d_7$ were previously stored in the external buffer 107 during the previous computation of the pixels ($x_8$ to $x_{15}$) of the same column but in the last previous band. In the case where there are no previous pixels (e.g. topmost band), the boundary is symmetrically reflected.

Figure 2:
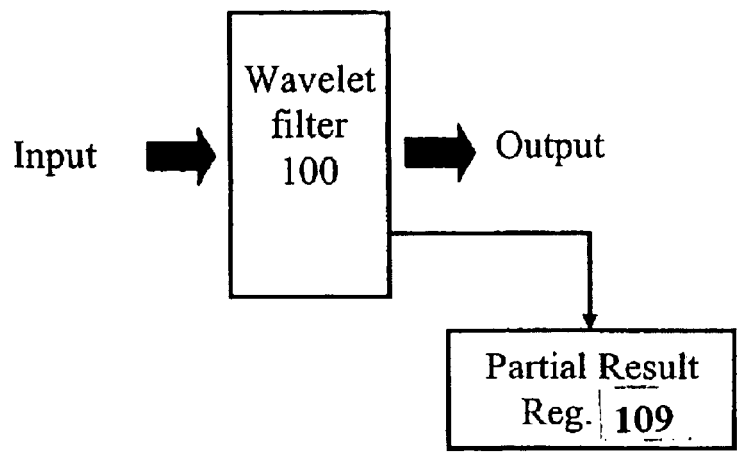
FIG. 2 is a schematic representation of the cascading of a wavelet filter of FIG. 1 in time.
Figure 2:
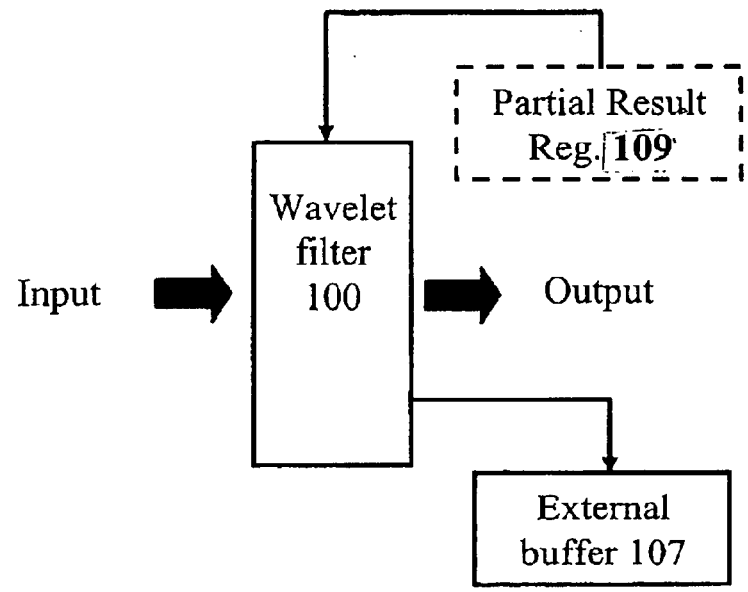

FIG. 2 illustrates the cascading of the wavelet filter of FIG. 1 in time. In cycle 0, for the first set of inputs the wavelet filter 100 either symmetrically reflects the pixels near the boundary or reads the required partial results from the external buffer 107. The filter 100 then stores the partial results into the partial results register 109, and outputs the low and high pass coefficients. In cycle 1, the lifling lattice is 'moved' to the next set of input lines, reads input from the partial results register 109, and outputs the next low and high pass coefficients. The partial results are stored in the partial results register 109 and the external buffer 107.

The first embodiment has been described with respect to a filter 100 having two groups of eight input lines 101 and eight two-input multiplexers 103-1 to 103-8. It would be apparent to a person skilled in the art that the number of groups can be increased (e.g. N=4 groups) with a corresponding modification of the eight multiplexers, (ie. eight N-input multiplexers). The external buffer 107 is a slow memory storage and requires at least a memory size equivalent to the size of an input pixel and a high pass coefficient times the number of columns. The filter 100 stores in external memory the last input pixel and the last high pass coefficient $x_{15}$ and $d_7$ of each column of each band for further processing in the next band. On the other hand, the partial results register 109 is a fast local storage and requires only a memory size of an input pixel and high pass coefficient.

The effective value of K' (the width of the band) can be increased by increasing the number of groups of pixels (eg. two groups, K'=2×K=16) or (four groups K'=4×K=32)). In the present embodiments, this has the advantage of reducing the number of accesses to the slow external memory. Namely, where there are multiple groups, the last pixel and last high pass coefficient can be stored in the fast local memory, namely the partial results register 109, rather than the slow external memory 107, thus enabling the wavelet transform to be performed more efficiently. Of course, the last pixel and last high pass coefficient of the last group is required to be stored in external memory. Furthermore, the amount of hardware required to implement the filter is not significantly increased. Still further, the filter has the capability of filtering with different values of K'.

In an alternate embodiment, the multiplexers 103-1, 103-2, 103-3, 103-4, 103-5, 103-6, 103-7, and 103-8 may be dispensed with. In this case, the multiplexing is done by a pixel-fetching mechanism implicitly. For instance, the pixels are fed to the lifting lattice from a frame buffer by an address generator.

Figure 3:
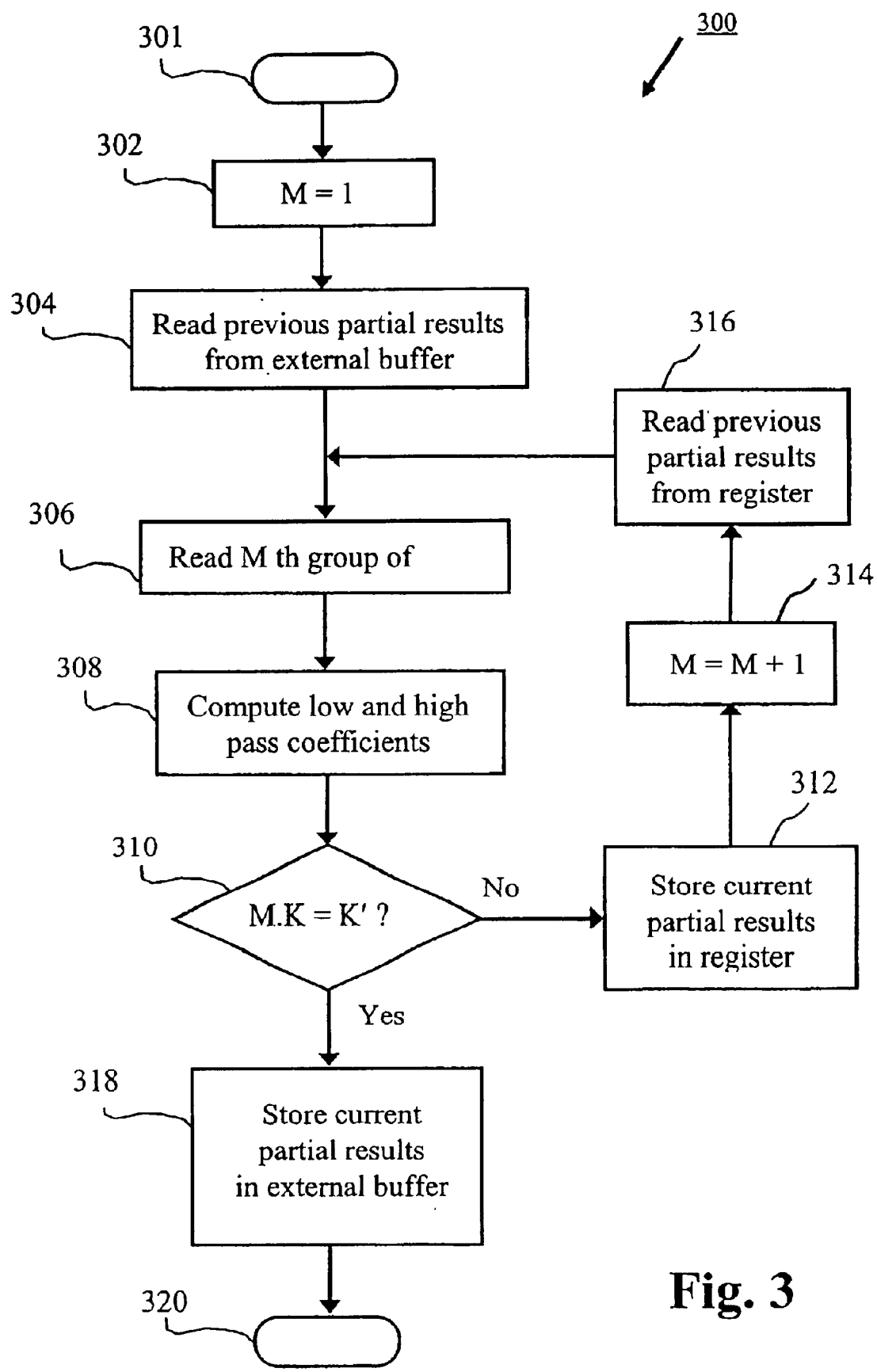
FIG. 3 is a flow diagram of a method for use in wavelet filtering in accordance with a second embodiment.

Turning now to FIG. 3, there is shown a method for use in wavelet filtering in one dimension in accordance with a second embodiment. The method comprises in part a sub-procedure 300 for use in the wavelet filtering of a digital image. As mentioned previously, the digital image comprises a plurality of pixels arranged in a plurality of columns in the vertical direction and a plurality of rows in the horizontal direction. The digital image comprises one or more horizontal bands, each of which comprise a plurality of the rows of pixels. The method processes one horizontal band of the digital image after another. The method initially commences processing the uppermost band of the image, and then processes the next adjacent band of the image, and so on until the lowermost band of the image is processed. Within each band, the method processes one column of pixels after another. The method first processes the left column of the band, and then the next adjacent column of the band, and so on until the right column of the band is reached. For ease of understanding, the pixels in each column of a band from the topmost pixel to the lowermost pixel are represented as $x_0$, $x_1$, $x_2$, ... $x_{K'-1}$.

The method of wavelet filtering calls the sub-procedure 300 for processing each column of a band. Within each column of a band, the sub-procedure 300 processes in turn a first group of K adjacent pixels, a second group of K adjacent pixels adjacent the first group , a third group of K adjacent pixels adjacent the second group, and so on to the last group of pixels. The top and bottom pixel of the first and last group of pixels respectively being located adjacent the boundary of the band.

In this way, the method of wavelet filtering performs a one dimensional discrete wavelet transform in the vertical direction. In another embodiment, the method can also be adapted to perform a one dimensional discrete wavelet transform in the horizontal direction by processing vertical bands one after another in similar fashion. In still another embodiment, the method can also be adapted to provide a 2-dimensional wavelet transform. In the latter case, the method processes one column at a time first, and the method after that collects the output and processes one row at a time.

The sub-procedure commences at step 301 and proceeds to step 302 where a counter M is set to one. As mentioned previously, the sub-procedure processes the pixels within a column of a band. The sub-procedure continues to a loop 306, 308, 310, 312, 314, and 316, where groups of a number K adjacent pixels are retrieved and processed one after another. A first group of K adjacent pixels (nearest the top boundary) is processed during the first pass of the loop 304 to 316, a next group of K adjacent pixels (adjacent the first group) is processed during the second pass of the loop 304 to 316, and so on. The processing of one group of pixels after another is achieved by incrementing the counter M. The sub-procedure terminates once K' pixels have been processed, when M.K.=K'. Preferably, K=4 and K'=4 or 8.

After the counter M has been set to one, the sub-procedure proceeds to step 304. In step 304, the method reads the corresponding previous partial results from an external buffer. These previous partial results have been stored in the external buffer during the processing of the sub-procedure of the same column in the last previous band of pixels. In the case where there are no previous pixels (e.g. topmost band) the boundary is symmetrically reflected.

After step 304, the method proceeds to loop 304 to 316. This loop will be described with respect to the general case where M=M'. During step 306, the sub-procedure reads the M'th group of K adjacent pixels and then computes the low and high pass coefficients in step 308 in accordance with the equations (1) and (2) described above. In computing these high and low pass coefficients the method takes as input the M'th group of K adjacent pixels. The method also accepts input from either the external buffer or a local register which stores the last pixel and the last high pass coefficient. The step 308 outputs to other discrete wavelet transform or entropy encoding procedures (not shown in the figure).

For example, in the case where the sub-procedure is currently processing the pixels ($x_8$, $x_9$, $x_{10}$, $x_{11}$, $x_{12}$, $x_{13}$, $x_{14}$, and $x_{15}$), the sub-procedure step 308 accepts as input the last pixel and high pass coefficient $x_7$ and $d_3$ from the partial result register, which were previously stored in the partial result register during the previous computation of the pixels ($x_0$, $x_1$, $x_2$, $x_3$, $x_4$, $x_5$, $x_6$, and $x_7$) of the same column and band. In the case where the sub-procedure is currently processing the pixels ($x_0$ to $x_7$), the sub-procedure step 308 accepts as input the last pixel and high pass coefficient from the external buffer. These latter inputs were previously stored in the external buffer during the previous computation of the last group of pixels of the same column but in the last previous band. In the case where there are no previous pixels (e.g. topmost band) the boundary is symmetrically reflected.

After step 308, the method proceeds to a decision block 310, where a check is made to determine whether M.K.=K'. If the decision block returns false, then the method proceeds to step 312, where the last pixel and last high pass coefficient are stored in the local partial results register for use in the computation 308 of the next group of pixels.

In the next step 314, the counter M is incremented and the last pixel and the last high pass coefficient are read in step 316. The method then returns to step 306 for the next pass of the loop 306 to 316. In the event the decision block 310 returns true, then the last pixel and the last high pass coefficient are stored in the external buffer and the sub-procedure finishes for the current column of the band.

As can be seen, the loop can be repeated as many times as desired to increase the value of K'.

The aforementioned preferred method comprise a particular control flow. There are many other variants of the preferred method which use different control flows without departing the spirit or scope of the invention. Furthermore one or more of the steps of the preferred method may be performed in parallel rather than sequentially.

Figure 4:
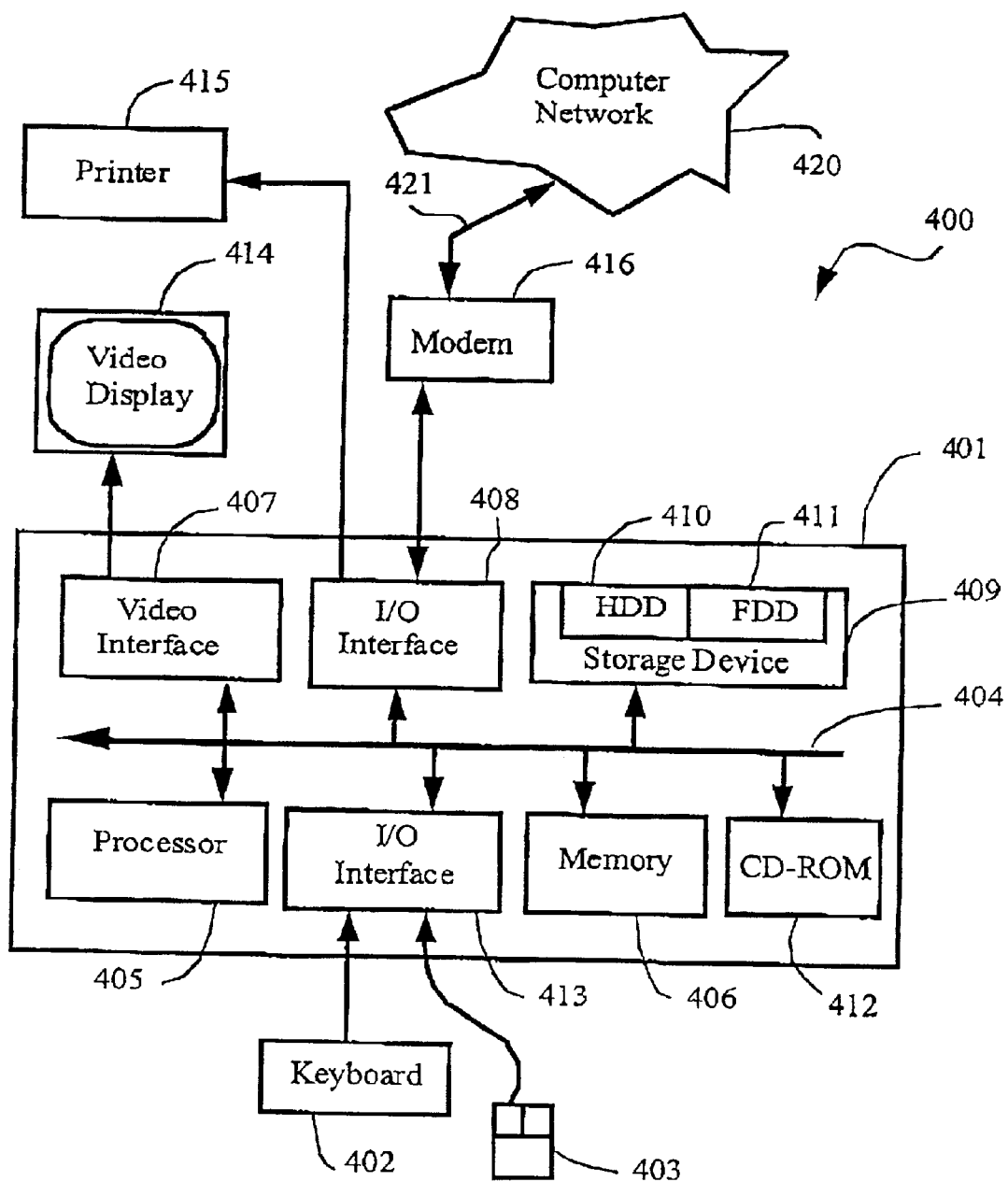
FIG. 4 is a schematic representation of a general-purpose computer for use in implementing the method of FIG. 3.

The method of FIG. 3 is preferably practiced in dedicated hardware, such as shown in FIG. 1. However, the method of FIG. 3 can also be practiced using a conventional general-purpose computer system 400, such as that shown in FIG. 4 wherein the processes of FIG. 3 may be implemented as software code, such as an application program executing within the computer system 400. In particular, the steps of method of FIG. 3 are effected by code instructions in the software that are carried out by the computer. This method has particular application in computer systems restricted to large slow external buffers and small fast local memories.

The software may be stored in a computer readable medium, including the storage devices described below, for example. The software is loaded into the computer from the computer readable medium, and then executed by the computer.

The use of the computer program readable medium together with the software in the computer system preferably effects an advantageous apparatus in accordance with the embodiments of the invention.

The computer system 400 comprises a computer module 401, input devices such as a keyboard 402 and mouse 403, output devices including a printer 415 and a display device 414. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN).

The computer module 401 typically includes at least one processor unit 405, a memory unit 406, for example formed from semiconductor random access memory (RAM) and read only memory (ROM), input/output (I/O) interfaces including a video interface 407, and an I/O interface 413 for the keyboard 402 and mouse 403 and optionally a joystick (not illustrated), and an interface 408 for the modem 416. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the embodiments can be practised include IBM-PC's and compatibles, Sun Sparc-stations or alike computer systems evolved therefrom.

Typically, the application program of the preferred embodiment is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable medium including magnetic tape, a ROM or integrated circuit, a magneto-optical disk, a radio or infra-red transmission channel between the computer module 401 and another device, a computer readable card such as a PCMCIA card, and the Internet and Intranets including email transmissions and information recorded on websites and the like. The foregoing is merely exemplary of relevant computer readable mediums Other computer readable mediums may be practiced without departing from the scope and spirit of the invention.

The aforementioned embodiment shown in FIG. 1 can be modified for use in a 5/3 inverse transform wavelet filter. In this modified embodiment, the 5/3 inverse transform wavelet filter calculates the original pixels from the low pass coefficients and high pass coefficients in accordance with the following formulae:

$$x_{2n} = s_n - \beta(d_{n-1} + d_n) \ n = 0, 1, \ldots, K-1 \tag{11}$$

and, $$x_{2n+1} = d_n - \alpha(x_{2n} + x_{2n+2}) \ n = -1, 0, \ldots K-2 \tag{12}$$

where α=−0.5 and β=0.25. The multiplier and adder units of FIG. 1 will be modified accordingly to compute the pixels in accordance with equations (11) and (12). This filter takes as input the coefficients $s_0$ to $s_{k-1}$ and $d_0$ to $d_{k-1}$, and also requires as input the coefficients $d_{-1}$ and $x_{-2}$ from the previous band, which are stored in the partial register 109 or external buffer 107.

The aforementioned embodiment of FIG. 1 can also be modified without departing from the spirit of the invention to other wavelet filters such as a 9/7 wavelet filters.

In this modified embodiment, the 9/7 forward transform wavelet filter computes the low pass coefficients and high pass coefficients in accordance with the following formulae:

$$d'_n = x_{2n+1} + \alpha(x_{2n} + x_{2n-2}) \quad n=0, 1, \ldots, K-1 \quad (14)$$

$$s'_n = x_{2n} + \beta(d'_{n-1} + d'_n) \quad n=0, 1, \ldots, K-1 \quad (15)$$

$$d_n = d'_n + \gamma(s'_n + s'_{n+1}) \quad n=-1, 0, \ldots, K-2 \quad (16)$$

$$sn = s'_n + \delta(d_{n-1} + d_n) \quad n=-1, 0, \ldots, K-2 \quad (17)$$

where $d_n$ are all the high pass coefficients, $s_n$ are all the low pass coefficients, $d'_n$ and $s'_{n-1}$ are intermediate values, α=−1.5861, β=−0.052980, γ=0.88291, and δ=0.44351. The multiplier and adder units of FIG. 1 will be modified accordingly to compute the coefficients in accordance with equations (14) to (17). This filter takes as input pixels $x_1$ to $x_k$ and also requires as input the pixel $x_0$, the intermediate values $d'_{n-1}$, and $s'_{n-1}$ and the high pass coefficient $d_{-2}$ from the previous band, which are stored in the partial register 109 or external buffer 107.

In another modified embodiment, the 9/7 inverse transform wavelet filter computes the original pixels from the low pass coefficients and high pass coefficients in accordance with the following formulae:

$$s'_n = s_n - \delta(d_{n-1} + d_n) \quad n=0, 1, \ldots, K-1 \quad (18)$$

$$d'_n = d_n - \gamma(s'_n + s'_{n+1}) \quad n=-1, 0, \ldots, K-2 \quad (19)$$

$$x_{2n} = S'_n - \beta(d'_{n+1} + d'_n) \quad n=-1, 0, \ldots, K-2 \quad (20)$$

$$x_{2n+1} = d'_n - \alpha(x_{2n} + x_{2n+2}) \quad n=-2, -1, \ldots, K-3 \quad (21)$$

where $d_n$ are all the high pass coefficients, $s_n$ all the low pass coefficients, $d'_n$ and $s'_n$ are intermediate values, α=−1.5861, β=−0.052980, γ=0.88291, and δ=0.44351. The multiplier and adder units of FIG. 1 will be modified accordingly to compute the pixels in accordance with equations (18) to (21). This filter takes as input coefficients $s_0$ to $s_{k-1}$ and $d_0$ to $d_{k-1}$ and also requires as input the pixel $x_{-4}$, the intermediate values $d'_{-2}$ and $s'_{-1}$, and the high pass coefficient $d_{-1}$ from the previous band which are stored in the partial register 109 or external buffer 107.

The aforementioned embodiment shown in FIG. 3 can also be modified in similar fashion to other wavelet filters, such as a 5/3 inverse transform wavelet filter or 9/7 wavelet filters.

INDUSTRIAL APPLICABILITY

It is apparent from the above that the embodiment(s) of the invention are applicable to the computer and data processing industries. In particular, the embodiments have application in digital data compression of digital images and videos.

The foregoing describes only one embodiment/some embodiments of the present invention, and modifications and/or changes can be made thereto without departing from the scope and spirit of the invention, the embodiment(s) being illustrative and not restrictive.

I claim:

1. A method of wavelet filtering a digital image, the digital image comprising a plurality of pixels, the method comprising the following steps performed for each of one or more bands of pixels:

retrieving a plurality of previous partial results from a local storage or a remote storage, said plurality of previous partial results comprising a pixel and a coefficient, the local storage having a greater bandwidth than the remote storage;

inputting a current group of adjacent pixels in a current band;

computing coefficients and a plurality of current partial results utilizing the current group of adjacent pixels and the plurality of previous partial results, the plurality of current partial results comprising a pixel and a coefficient;

outputting the coefficients; and storing the plurality of current partial results in said local storage if the current group of adjacent pixels is not a last group in the band, or in said remote storage if the current group of adjacent pixels is the last group in the band.

2. A method as claimed in claim 1, wherein said local storage is a register.

3. A method as claimed in claim 1 or 2, wherein said remote storage is an external buffer.

4. A method as claimed in claim 1, wherein the digital image is an original image and said wavelet filtering performs a forward wavelet transform.

5. A method as claimed in claim 4, wherein said computing step is calculated in accordance with a 9/7 forward wavelet transform.

6. A method as claimed in claim 1, wherein the digital image is a sub-band of an original image and the pixels are coefficients and said wavelet filtering performs a forward wavelet transform.

7. A method as claimed in claim 4 or 6, wherein said computing step is calculated in accordance with a 5/3 forward wavelet transform.

8. A method as claimed in claim 1, wherein the digital image is one or more associated sub-bands of an original image, and the pixels are coefficients and said wavelet filtering performs an inverse wavelet transform.

9. A method as claimed in claim 8, wherein said computing step is calculated in accordance with a 5/3 inverse wavelet transform.

10. A method as claimed in claim 8, wherein said computing step is calculated in accordance with a 9/7 inverse wavelet transform.

11. A method as claimed in claim 1, wherein said method further comprises:

repeating said retrieving, inputting, computing, outputting, and storing steps in sequence a plurality of times.

12. A method as claimed in claim 1, wherein the pixel and the coefficient of the previous partial results are, respectively, a last input pixel and a last high pass coefficient.

13. A method as claimed in claim 1, wherein the plurality of partial results comprises intermediate values.

14. Apparatus for wavelet filtering a digital image, the digital image comprising a plurality of pixels, the apparatus comprising:

means for retrieving, for each of one or more bands of pixels, a plurality of previous partial results from a local storage or a remote storage, the plurality of previous partial results comprising a pixel and a coefficient, the local storage having a greater bandwidth than the remote storage;

means for inputting, for each of one or more bands of pixels, a current group of adjacent pixels in a current band;

means for computing coefficients and a plurality of partial results, for each of one or more bands of pixels, utilizing the current group of adjacent pixels and the plurality of previous partial results, the plurality of current partial results comprising a pixel and a coefficient;

means for outputting, for each of one or more bands of pixels, the coefficients; and means for storing the plurality of current partial results in said local storage if the current group of adjacent pixels is not a last group in the band, or in said remote storage if the current group of adjacent pixels is the last group in the band.

15. Apparatus as claimed in claim 14, wherein said local storage is a register.

16. Apparatus as claimed in claim 14 or 15, wherein said remote storage is an external buffer.

17. A computer readable medium comprising a computer program for wavelet filtering a digital image, the digital image comprising a plurality of pixels, the computer program comprising:

code for retrieving, for each of one or more bands of pixels, a plurality of previous partial results from a local storage or a remote storage, the plurality of previous partial results comprising a pixel and a coefficient, the local storage having a greater bandwidth than the remote storage;

code for inputting, for each of one or more bands of pixels, a current group of adjacent pixels in a current band;

code for computing coefficients and a plurality of partial results, for each of one or more bands of pixels, utilizing the current group of adjacent pixels and the plurality of previous partial results, the plurality of current partial results comprising a pixel and a coefficient;

code for outputting, for each of one or more bands of pixels, the coefficients; and code for storing the plurality of current partial results in said local storage if the current group of adjacent pixels is not a last group in the band, or in said remote storage if the current group of adjacent pixels is the last group in the band.

18. A computer readable medium as claimed in claim 17, wherein said local storage is a register.

19. A computer readable medium as claimed in claim 17 or 18, wherein said remote storage is an external buffer.

20. A wavelet filter for wavelet filtering a digital image, the digital image comprising a plurality of pixels processed in one or more bands of pixels, the filter comprising:

a local storage for storing a plurality of previous partial results, the plurality of previous partial results comprising a pixel and a coefficient;

a remote storage for storing a plurality of previous partial results, the plurality of previous partial results comprising a pixel and a coefficient, the local storage having a greater bandwidth than the remote storage;

a controller for selecting the plurality of previous partial results from said local storage or said remote storage;

a pixel input mechanism for inputting a current group of adjacent pixels in a current band;

a lifting lattice of multiplier and adder units for computing coefficients and a plurality of current partial results utilizing the current group of adjacent pixels and the selected plurality of previous partial results, the plurality of current partial results comprising a pixel and a coefficient;

output means for outputting the coefficients; and a controller for storing the plurality of current partial results in said local storage if the current group of adjacent pixels is not a last group in the band, or in said remote storage if the current group of adjacent pixels is the last group in the band.

21. A wavelet filter as claimed in claim 20, wherein said local storage is a register.

22. A wavelet filter as claimed in claim 20 or 21, wherein said remote storage is an external buffer.

23. A wavelet filter as claimed in claim 20, wherein said pixel input mechanism comprises a plurality of multiplexers for selecting in turn a group of pixels as the current group.

24. A wavelet filter as claimed in claim 20, wherein the digital image is an original image and said wavelet filtering performs a forward wavelet transform.

25. A wavelet filter as claimed in claim 20, wherein the digital image is a sub-band of an original image and the pixels are coefficients and said wavelet filtering performs a forward wavelet transform.

26. A wavelet filter as claimed in claim 20, wherein the digital image is one or more associated sub-bands of an original image, and the pixels are coefficients and said wavelet filtering performs an inverse wavelet transform.

* * * * *

UNITED STATES PATENT AND TRADEMARK OFFICE
CERTIFICATE OF CORRECTION

PATENT NO. : 6,922,491 B2
DATED : July 26, 2005
INVENTOR(S) : Dominic Yip

It is certified that error appears in the above-identified patent and that said Letters Patent is hereby corrected as shown below:

<u>Column 4,</u>
Line 47, "$d_0=x_0+\alpha(x_{-1}+x_1 0)$" should read -- $d_0=x_0+\alpha(x_{-1}+x_1)$ --.

<u>Column 9,</u>
Line 14, "$d'_n=x_{2n+1}+\alpha(x_{2n}+x_{2n-2})$" should read -- $d'_n=x_{2n+1}+\alpha(x_{2n}+x_{2n+2})$ --; and
Line 38, "$x_{2n}=S'_n-\beta(d'_{n+1}+d'_n)$" should read -- $x_{2n}=S'_n-\beta(d'_{n-1}+d'_n)$ --.

Signed and Sealed this

Twenty-first Day of March, 2006

JON W. DUDAS
*Director of the United States Patent and Trademark Office*